United States Patent
Haindl et al.

(10) Patent No.: US 8,048,467 B2
(45) Date of Patent: Nov. 1, 2011

(54) DAIRY PRODUCT OF FIRM CONSISTENCY HAVING A HOMOGENEOUS STRUCTURE AND COMPRISING A PLURALITY OF ADJACENT CELLS

(75) Inventors: Rudolf F. Haindl, Salzburg (AT); Hans Mandl, Pfunds (AT)

(73) Assignee: Hama Foodservice GESMBH, Hof Bei Salzburg (AT)

( * ) Notice: Subject to any disclaimer, the term of this patent is extended or adjusted under 35 U.S.C. 154(b) by 0 days.

(21) Appl. No.: 10/984,187

(22) Filed: Nov. 8, 2004

(65) Prior Publication Data

US 2005/0181106 A1    Aug. 18, 2005

Related U.S. Application Data

(63) Continuation-in-part of application No. 10/223,129, filed on Aug. 18, 2002, now Pat. No. 6,830,772, which is a continuation-in-part of application No. 09/665,407, filed on Sep. 20, 2000, now abandoned.

(30) Foreign Application Priority Data

Sep. 21, 1999    (AT) ....................................... 1607/99

(51) Int. Cl.
*A23C 9/154*    (2006.01)
*A23C 1/05*    (2006.01)

(52) U.S. Cl. ......... 426/580; 426/570; 426/576; 426/586

(58) Field of Classification Search ............. 426/570, 426/573, 576, 580, 586
See application file for complete search history.

(56) References Cited

U.S. PATENT DOCUMENTS 6,830,772 B2 *  12/2004  Haindl et al. ................. 426/576

FOREIGN PATENT DOCUMENTS

| DE | 2348023 A1 | 4/1975 |
|----|-----|-----|
| DE | 19528936 A1 | 2/1997 |
| DE | 2600028 A1 | 7/1997 |
| DE | 19860437 A1 | 9/1999 |
| EP | 0897670 A1 | 2/1999 |
| EP | 1 086 625 A1 | 3/2001 |
| GB | 1467422 * | 3/1977 |
| WO | 92/22215 * | 12/1992 |
| WO | WO 96/21361 | 7/1996 |
| WO | WO 97/06695 | 2/1997 |

OTHER PUBLICATIONS

Database WPI, Section CH, Week 199336, Derwent Publications Ltd., London, GB; class A97, AN 1993-286850 XP002178316 & SU 1 762 863A (UKR Meat Dairy Inst.), Sep. 23, 1992- Abstract.
International Search Report conducted by the European Patent Office w/ English Version (form PCT/ISA/210) for International Application No. PCT/AT01/00016.

* cited by examiner

*Primary Examiner* — Leslie Wong
(74) *Attorney, Agent, or Firm* — Wenderoth, Lind & Ponack, L.L.P.

(57) ABSTRACT

A dairy product of firm consistency having a homogeneous structure and comprising a plurality of adjacent cells, each cell having a core comprising a milk protein, an inner shell around the core and comprising milk fat and on outer shell around the inner shell and comprising gelatin enriched with at least one component of a milk product.

17 Claims, 3 Drawing Sheets

DAIRY PRODUCT OF FIRM CONSISTENCY HAVING A HOMOGENEOUS STRUCTURE AND COMPRISING A PLURALITY OF ADJACENT CELLS

CROSS REFERENCE TO RELATED APPLICATIONS

This application is a continuation-in-part of U.S. patent application Ser. No. 10/223,129 filed on Aug. 18, 2002, now U.S. Pat. No. 6,830,772, the contents of which are incorporated by reference in their entirety, and which is a continuation-in-part of U.S. patent application Ser. No. 09/665,407 filed Sep. 20, 2000, now abandoned, the contents of which are incorporated by reference in their entirety.

FIELD OF INVENTION

The invention concerns a process for the production of a dairy product containing gelatine and cream wherein the ingredients are mixed, heated and put into the pack. The invention further concerns a dairy product which in particular is produced by that process.

BACKGROUND

A dairy product of that kind is described in EP 0 805 629 B 1. It has been found however that the previously known processes do not promote to the desired extent the deployment of the gelatine which has a substantial influence on taste, consistency and separation of the end product.

SUMMARY OF INVENTION

An object of the invention is to provide a process for the production of a gelatine-bearing dairy product, which permits as full deployment of the gelatine as possible.

In the process according to the invention, that is attained in that skimmed milk is mixed with the gelatine in a mixing tank, that mixture is then left to soak and in further succession it is mixed with the remaining ingredients.

The use of gelatine in granule form with a grain size of preferably about 50 mesh and a gel rigidity of between 200 and 250 Bloom gram as well as skimmed milk whose fat proportion is between 0.1% and 0.01%, preferably about 0.02%, for producing that mixture, has proven to be particularly appropriate in terms of wetting of the gelatine with the skimmed milk and thus the gelatine deployment options. In this respect all percentages are percent by weight.

In order to achieve intimate mixing with the gelatine the skimmed milk can be heated in a mixing tank to a temperature of between 25° C. and 40° C. and in further succession the gelatine can be stirred in with vigorous agitation. Thereafter it is desirable if the mixture is left to soak with slight agitation for approximately half an hour and prior to mixing with the remaining ingredients heated for about a minute to a temperature of between 55° C. and 65° C., preferably to 60° C., before the operation of mixing with the cream whose fat content is about 16% is effected.

A suitable selection and combination of the raw materials for the gelatine, while precisely observing given temperature and time parameters, results in the formation of an albumin structure which has the capability of no longer changing its formed structure. In other words, the dairy product produced in that way can be heated and cooled a plurality of times without breaking down. That effect could be achieved in accordance with the state of the art only with the addition of additive materials. The use of additive materials of that kind is no longer required in the process according to the invention in which the gelatine serves not only as a stabiliser in regard to viscosity but also a stabiliser in regard to the stability of the dairy product.

In order for the end product to keep for a long period in the uncooled condition, it is particularly advantageous if the mixture which contains at least cream and gelatine enriched with skimmed milk and whose pH-value is between 4 and 6.6 is briefly heated before being put into the pack, to a temperature which is above 120° C.

In order to achieve adequate resistance for the end product at room temperature, it is preferably provided that the mixture containing at least cream and gelatine enriched with skimmed milk is maintained up to the heating operation at a value of between 20° C. and 40° C.

It is preferably provided that the mixture containing at least cream and gelatine enriched with skimmed milk is homogenized preferably in one stage at a temperature of below 100° C. at high pressure in order to achieve a uniform size or distribution of the fat particles.

In order to prevent separation or deflocculation of the gelatine, it has proven to be particularly desirable if the filling temperature of the mixture is between 20° C. and 30° C.

In accordance with a further aspect of the invention, it seeks to provide a dairy product which is produced in particular in accordance with that method.

A dairy product of that kind is characterized in that it contains gelatine enriched with skimmed milk, mixed with cream.

It has been found particularly desirable in terms of consistency and durability of the novel dairy product if at least 70% of cream is used and the gelatine proportion is between 1% and 3%, preferably being 1.50%.

So that the novel dairy product has a preferred fat content of about 15%, in accordance with a further embodiment it is provided that high-fat cream is added to the mixture containing at least cream and gelatine enriched with skimmed milk.

The invention will be described in greater detail hereinafter by means of a preferred embodiment with reference to the drawing in which:

DETAILED DESCRIPTION OF THE INVENTION

Figure 1:
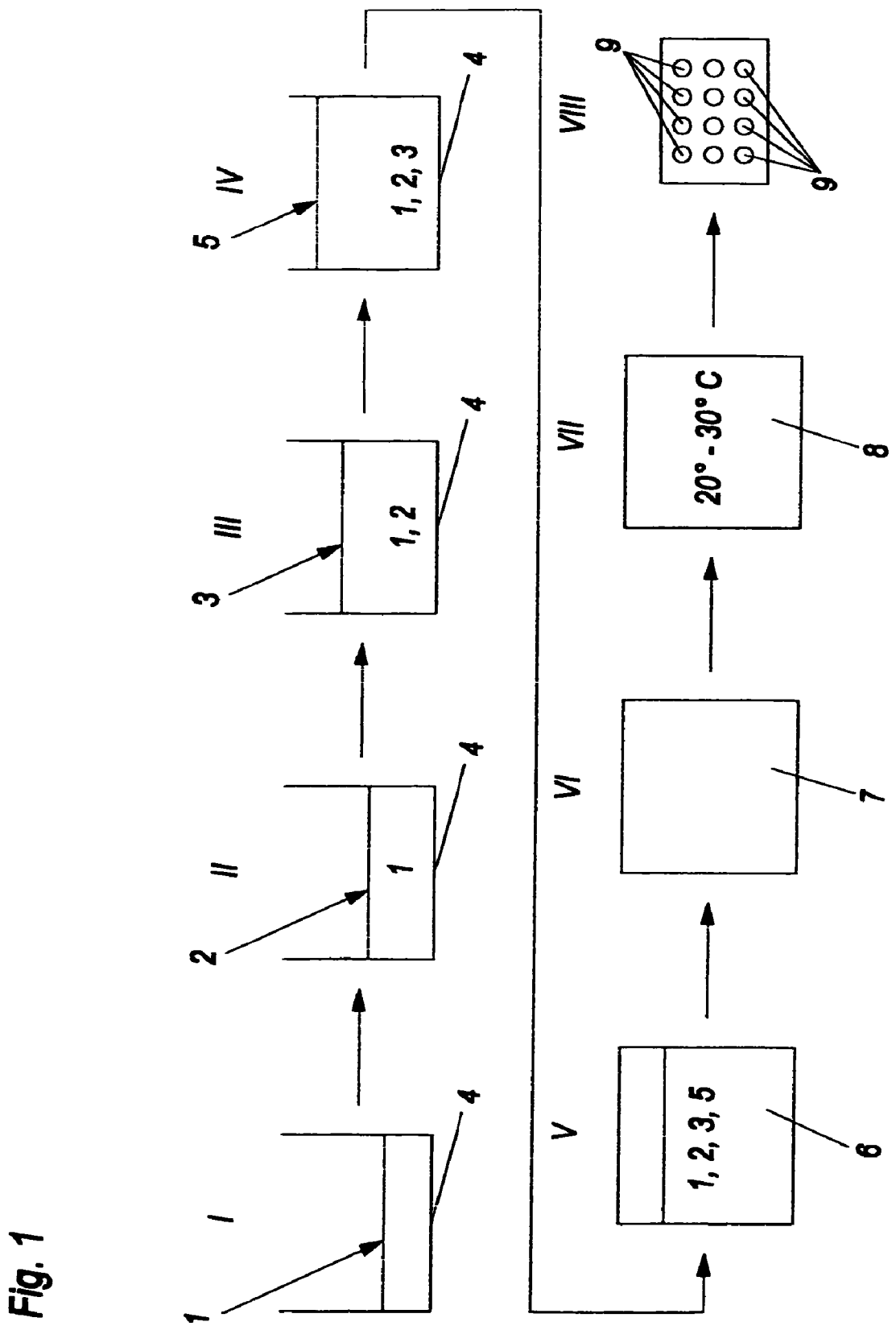
FIG. 1 is a diagrammatic representation of a manner of carrying out the process according to the invention.
Figure 2:
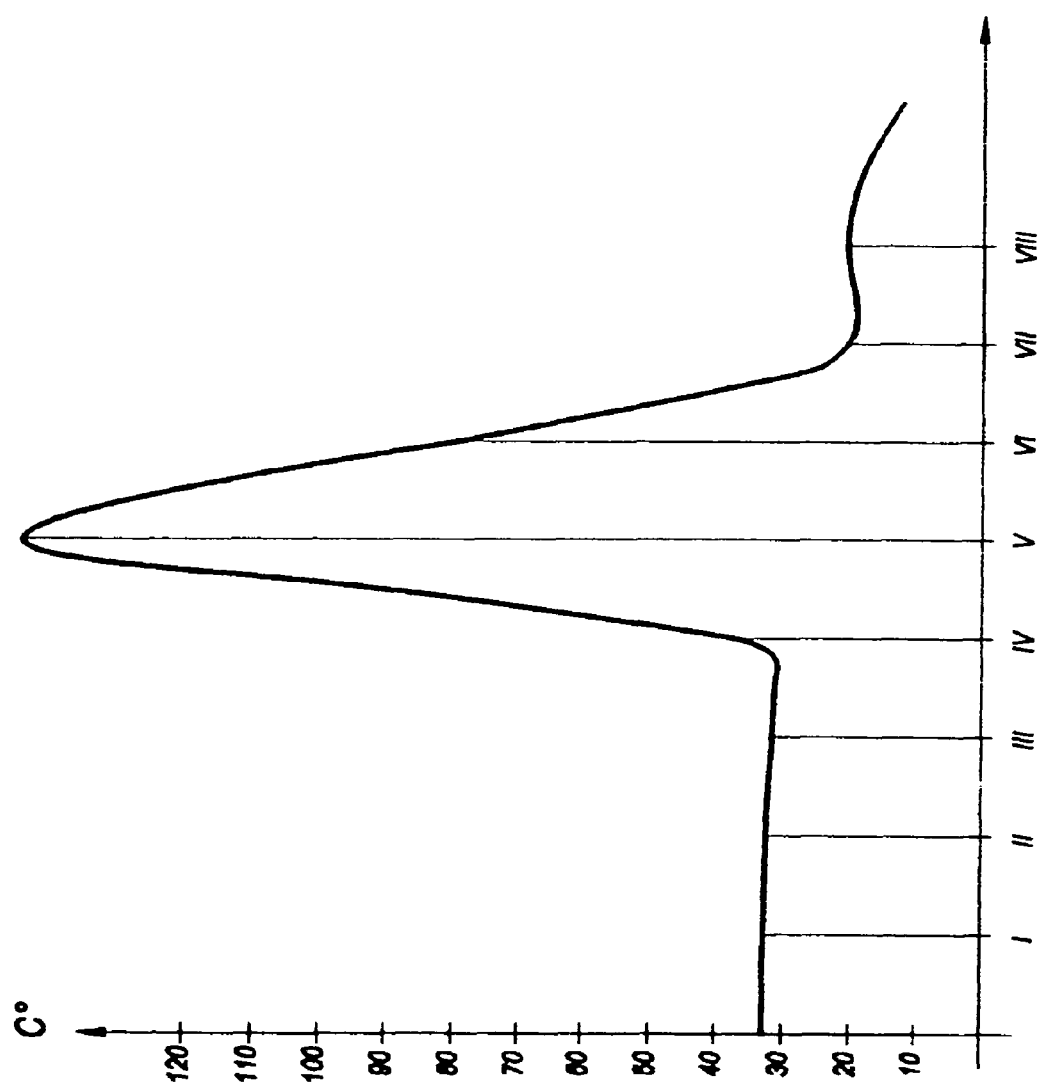
FIG. 2 shows the approximate temperature configuration during the individual steps in the process.

In step I skimmed milk 1 is heated in a mixing tank 2 to a temperature which is between 25° C. and 40° C. A food gelatine 2 in granule form can then be stirred into that heated skimmed milk 1 with a turbomixer, for example of the Ytron type.

It has been found that the choice of the gelatine influences the stability and life of the end product. Great significance is therefore attributed to the correct selection and combination of the raw materials for the gelatine, in which respect tests have shown that both animal and also vegetable gelatine is suitable for use in the process according to the invention. In the present embodiment by way of example the gelatine is produced from five different kinds of medium- and/or high- Bloom split cowhide and has a gel rigidity of about 220 Bloom gram. The viscosity of that gelatine is about 41 millibars, with the viscosity being directly proportional to the Bloom grams. In this embodiment the viscosity of the gelatine is established in such a way that a mixture with 6⅔% gelatine proportion is stirred, that mixture is heated in a water bath to 60° C., a sample is drawn off and viscosity is determined from that sample.

After the gelatine is stirred into the skimmed milk the mixture is left to soak for at least 15 minutes and preferably approximately half an hour. After that soaking operation the mixture is heated for about 1 minute at about 60° C. in order to promote mixing of the gelatine with the skimmed milk.

In step III cream 3 with for example 15% by weight of fat is added. In further succession, in this preferred embodiment, high-fat cream 5 is added in step IV to that mixture which contains at least cream and gelatine enriched with skim milk and which has a fat content of about 13%-14%, in order to obtain an end product with a fat content of about 15%.

Before the pack is filled, in order to provide that the product keeps for a long time, brief heating at over at least 120° C. and preferably over 130° C. is effected in an UHT-installation 6 (step V). A suitable ultrahigh temperature heating installation is for example the Finnah/ST2 installation.

Thereupon the mixture containing at least cream and gelatine enriched with skimmed milk is homogenised in a homogeniser 7 at for example 80° C. and under a pressure of between 185 and 215 bars (step VI). After cooling to a temperature of between 20° C. and 30° C. in the filling machine 8 (step VII), an aseptic filling operation can be effected to fill pack units 9 which for example—as is known per se—comprise card and/or paper and which are lined with aluminum and/or plastic material (preferably polyethylene), whereupon rapid cooling to at least 15° C. is effected in a cold-storage depot (step VIII).

Figure 3:
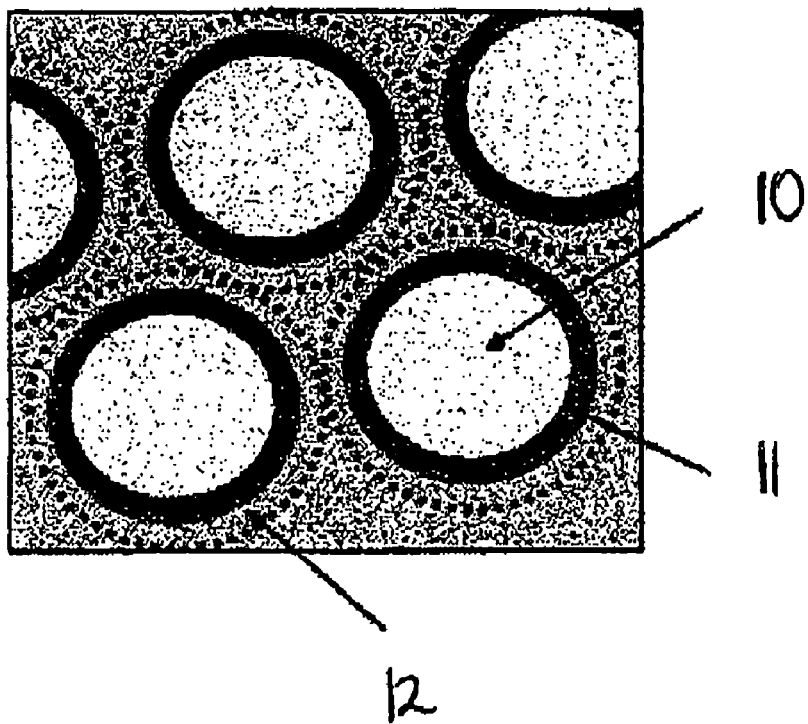
FIG. 3 shows an enlarged view of the cell structure of a novel dairy product.
Figure 4:
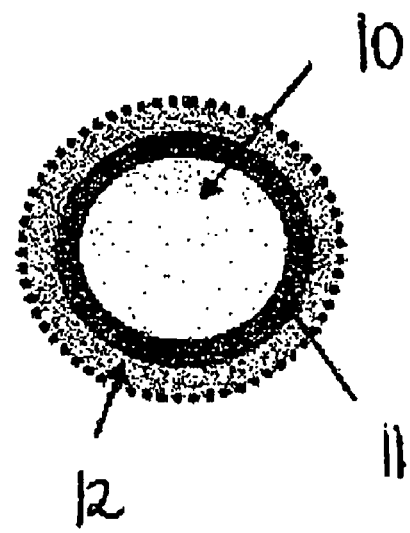
FIG. 4 shows an enlarged view of a single cell.

The milk product having a microscopically detectable structure as shown in FIGS. 3 and 4 may be obtained by the process described above or by similar process. It has a firm consistency (at 20° C.) and comprises a plurality of adjacent cells as shown in FIG. 3. Each cell (see FIG. 4) has a core 10 comprising a milk protein and other milk ingredients, for example milk sugar or minerals. This core 10 is encompassed by an inner shell 11 comprising milk fat. This milk fat is essentially the milk fat of the cream added during the production process.

Finally, an outer shell 12 encompasses the inner shell 11. This outer shell 12 comprises gelatin enriched with a milk fat. Such an enriched gelatin can be obtained by diluting gelatin in skim milk or another milk product. The enriched gelatin serves as a stabilizer and is preferably the only stabilizer used.

The structure shown in FIGS. 3 and 4 provides a milk product containing cream and gelatin, which can be heated and cooled for several times without breaking down, i.e. the original consistency or structure is maintained when the product is cooled again after heating. During heating, the consistency may change between a firm or stiff consistency to almost a fluid consistency. Still, when cooled down, the product will again assume the firm and stiff consistency without decomposition.

As noted above, it has been found that the choice of gelatine influences the stability and life of the end product. Greater significance is therefore attributed to the correct selection and combination of raw materials for the gelatine. Test results, from tests performed by the applicants, show that the dairy product according to the present invention, yields superior and unexpected beneficial properties in its field. These test results will be described in greater detail hereinafter by the following explanations.

His known that the essential properties of dairy products, such as the reversibility of the structure, the ability to absorb oil and the viscosity, depend on the specific embodiment of gelatine, especially the grain size and the gel rigidity. Therefore, tests have been made out in three different phases of the dairy product, according to the invention.

A) Phase I

Skimmed Milk+Gelatine

Test Result 1

Stirring Gelatine into Skimmed Milk

Heating up 0.03 l skimmed milk to a temperature of 35° C., then stirring in gelatine with a mixer "kitchen aid" at level 4
a) 2.8 g Gelatine in 0.03 l Skimmed Milk

|      | bloom |      |      |
|------|-------|------|------|
| mesh | 180   | 220  | 260  |
| 140  | good  | good | good |
| 50   | very good | very good | very good |
| 20   | very good | very good | very good | b) 6 g Gelatine in 0.03 l Skimmed Milk

|      | bloom |      |      |
|------|-------|------|------|
| mesh | 180   | 220  | 260  |
| 140  | good  | good | good |
| 50   | very good | very good | very good |
| 20   | very good | very good | very good | b) 12 g Gelatine in 0.03 l Skimmed Milk

|      | bloom |      |      |
|------|-------|------|------|
| mesh | 180   | 220  | 260  |
| 140  | good  | good | good |
| 50   | very good | very good | very good |
| 20   | very good | very good | very good |

In test 1 0.03 l skimmed milk were heated up to a temperature of 35° C. in a mixing tank, then gelatine was stirred in with vigorous agitation with a mixer "kitchen-aid" at level 4. Attention is first drawn to test result 1a) to 1c) which shows results for stirring in various amounts of gelatine with different grain sizes and different gel rigidities in 0.03 l skimmed milk. As it can be seen, the gel rigidity of the used gelatine has not such great influence on the behaviour of the gelatine when stirred into the skimmed milk as the grain size of the gelatine. Fine grained gelatine, for example gelatine with a grain size of 140 mesh, cannot be stirred into skimmed milk as well as coarse grained gelatine.

After stirring in gelatine in 0.03 l skimmed milk, the mixtures were then left to soak with slide agitation at a temperature of 35° C. and heated for five minutes to a temperature of 60° C.

Test Result 2

Dissolution of Gelatine in Skimmed Milk 2.1) The Mixture of Test 1 is Left to Soak for 20 Minutes at a Temperature of 35° C. and is then Heated up to a Temperature of 60° C. for 5 Minutes
a) 2.8 g Gelatine

|      | bloom     |           |           |
| ---- | --------- | --------- | --------- |
| mesh | 180       | 220       | 260       |
| 140  | dissolved | dissolved | dissolved |
| 50   | dissolved | dissolved | dissolved |
| 20   | separated | separated | separated | b) 6 g Gelatine

|      | bloom     |           |           |
| ---- | --------- | --------- | --------- |
| mesh | 180       | 220       | 260       |
| 140  | dissolved | dissolved | dissolved |
| 50   | dissolved | dissolved | dissolved |
| 20   | separated | separated | separated | c) 12 g Gelatine

|      | bloom     |           |           |
| ---- | --------- | --------- | --------- |
| mesh | 180       | 220       | 260       |
| 140  | dissolved | dissolved | dissolved |
| 50   | dissolved | dissolved | dissolved |
| 20   | separated | separated | separated |

2.2) The Mixture of Test 1 is Left to Soak for 35 Minutes at a Temperature of 35° C. and is then Heated up to a Temperature of 60° C. for 5 Minutes.
a) 2.8 g Gelatine

|      | bloom     |           |           |
| ---- | --------- | --------- | --------- |
| mesh | 180       | 220       | 260       |
| 140  | dissolved | dissolved | dissolved |
| 50   | dissolved | dissolved | dissolved |
| 20   | separated | separated | separated | b) 6 g Gelatine

|      | bloom     |           |           |
| ---- | --------- | --------- | --------- |
| mesh | 180       | 220       | 260       |
| 140  | dissolved | dissolved | dissolved |
| 50   | dissolved | dissolved | dissolved |
| 20   | separated | separated | separated | c) 12 g Gelatine

|      | bloom     |           |           |
| ---- | --------- | --------- | --------- |
| mesh | 180       | 220       | 260       |
| 140  | dissolved | dissolved | dissolved |
| 50   | dissolved | dissolved | dissolved |
| 20   | separated | separated | separated |

In test result 2, results for different times of swelling are shown. In test 2.1 the mixture of skimmed milk and gelatine is left to soak for 20 minutes at a temperature of 35° C. and is then heated up to a temperature of 60° C. for five minutes Test result 2.2 shows the result for the same mixture of skimmed milk and gelatine when it is left to soak for 35 minutes at a temperature of 35° C. and is then heated up to a temperature of 60° C. for five minutes. The key result of this test lies in the comparison of the two tables wherein it can be seen that the the gelatine with a grain size of 20 mesh did not dissolve in the skimmed milk, at a swelling time of 25 minutes or 40 minutes.

As a result of the foregoing tests wherein the behaviour of the various kinds of gelatine stirred into skimmed milk has been tested, gelatine with a grain size of 20 mesh has been eliminated for the following tests because such a gelatine of 20 mesh independent of its gel rigidity, does not dissolve in skimmed milk and therefore this gelatine is not suitable for making a dairy product having a reversibility of structure and a satisfying ability to absorb oil. Even stirring in such a gelatine into skimmed milk will lead to a satisfying result B) Phase II Skimmed Milk+Gelatine+Cream (16% Fat Content)=Dairy Product of the Invention The following tests 3 to 5 are performed on a dairy product according to the invention. Therefore, the resulting mixtures of test 2 were mixed with cream with a fat content of 16% These mixtures are then heated briefly to a temperature of 125° C. and are homogenised.

Test Result 3

Separation after Shock-Cooling

The mixtures of test result 2 are mixed with cream with a fat content of 16%. They are then heated briefly to a temperature of 125° C. and are homogenised in order to get 0.4 kg of a dairy product according to the invention. The dairy products were then shock-tested by cooling down to a temperature of 5° C.

a) 2.8 g Gelatine; 0.3672 l Cream

|      | bloom     |           |           |
| ---- | --------- | --------- | --------- |
| mesh | 180       | 220       | 260       |
| 140  | separated | separated | separated |
| 50   | separated | separated | separated | b) 6 g Gelatine; 0.364 l Cream

| mesh | bloom | | |
|---|---|---|---|
| | 180 | 220 | 260 |
| 140 | separated | ok | too rigid |
| 50 | separated | ok | too rigid | c) 12 g gelatine; 0.358 l cream

| mesh | bloom | | |
|---|---|---|---|
| | 180 | 220 | 260 |
| 140 | ok | too rigid | too rigid |
| 50 | ok | too rigid | too rigid |

In test 3 the so produced dairy products have been cooled down to a temperature of 5° C. in a shock cooler. Comparing the three tables a) to c), it can be seen that the dairy product which contains 2.8 g (0.7%) gelatine is not consistent this means separation of the ingredients of the dairy product takes place. It is to be noted and can be seen in table b) and c) that those dairy products which contain 6 g (1.5%) gelatine, wherein the gelatine has a gel rigidity of 260 Bloom grams, and the dairy product which contains 12 g (3%) gelatine, wherein the gel rigidity of the gelatine is 220 or 260 Bloom grams, are too rigid for further manipulation of the dairy product. This means these dairy products cannot serve as a basis for further manipulation, for example as a basis for mayonnaise or cakes.

Test Result 4

To Whisk Smooth

The mixtures of test result 2 are mixed with cream with a fat content of 16%. They are then heated briefly to a temperature of 125° C. and are homogenised in order to get 0.4 kg of a dairy product according to the invention. After cooling down the dairy products to a temperature of 10° C. the products are whisked with the mixer "kitchen aid" at level 4 for 8 minutes.

a) 2.8 g Gelatine; 0.3672 l Cream

| mesh | bloom | | |
|---|---|---|---|
| | 180 | 220 | 260 |
| 140 | too weak | too weak | too weak |
| 50 | too weak | too weak | coagulated | b) 6 g Gelatine; 0.364 l Cream

| mesh | bloom | | |
|---|---|---|---|
| | 180 | 220 | 260 |
| 140 | too weak | ok | too rigid |
| 50 | not smooth | ok | too rigid | c) 12 g Gelatine; 0.358 l Cream

| mesh | bloom | | |
|---|---|---|---|
| | 180 | 220 | 260 |
| 140 | coagulated | coagulated | too rigid |
| 50 | too rigid | too rigid | too rigid |

In test 4, results for a dairy product of the invention having been whisked smooth are shown. The mixtures of test result 2 are mixed with cream whose fat content is 16%. Then they are heated briefly to a temperature of 125° C. and are homogenised in order to get 0.4 kg of a dairy product according to the invention. After producing the dairy products, they are cooled down to a temperature of 10° C. In order to find out if these dairy products can serve as basis for further manipulation, the dairy products are whisked to smooth with the mixer "kitchen-aid" at level 4 for eight minutes As it can be seen only the dairy product which contents 6 g (1.5%) gelatine wherein the gelatine has a grain size of 50 mesh and a gel rigidity of 220 Bloom grams leads to a satisfying result Although most of the tested dairy products are able to become smooth, only the above mentioned combination is neither too weak nor too rigid. This combination can serve as an ideal basis for further manipulation.

Test Result 5

Viscosity

Measuring the dairy product after producing and cooling down to a temperature of 10° C. with a BROOCKFIELD Viscosimeter RV_DVE using a Helipat Spindel with 10 rpm.

a) 2.8 g Gelatine; 0.3672 l Cream

| mesh | bloom | | |
|---|---|---|---|
| | 180 | 220 | 260 |
| 140 | 109.000 cP | 122.000 cP | 138.000 cP |
| 50 | 110.000 cP | 126.000 cP | 146.000 cP | b) 6 g Gelatine; 0.364 l Cream

| mesh | bloom | | |
|---|---|---|---|
| | 180 | 220 | 260 |
| 140 | 136.000 cP | 165.000 cP | 215.000 cP |
| 50 | 138.000 cP | 175.000 cP | 220.000 cP | c) 12 g Gelatine; 0.358 l Cream

| mesh | bloom | | |
|---|---|---|---|
| | 180 | 220 | 260 |
| 140 | 206.000 cP | 243.000 cP | 347.000 cP |
| 50 | 210.000 cP | 260.000 cP | 360.000 cP |

Turning now to test result 5, a further important parameter for a milk product of the type of the invention is the viscosity which is proportional to a pressure value in a Brookfield Viscosimeter. The pressure or viscosity values for a dairy product according to the invention should be between 170.000 to 185.000 cP in order to achieve such a sliceable consistency that the dairy product can be used as a basis for cakes for example.

Comparing the results of tests 3 to 5 and making an intersection, shows that only the dairy product contenting 6 g (1.5%) gelatine having a grain size of 50 mesh and a gel rigidity of 220 Bloom grams, meets the requirements adjusted to a novel dairy product.

C) Phase III

Dairy Product of the Invention+Further Ingredients

Test Result 6

Reversibility of the Structure 0.4 l cream with a fat content of 36% has been added to 0.4 kg dairy product. Then the structure of this mixture has been destroyed with sheer forces before cooling down the mixture to a temperature of 10° C.

a) 2.8 g Gelatine; 0.3672 l Cream

|      | bloom |      |      |
| ---- | ----- | ---- | ---- |
| mesh | 180   | 220  | 260  |
| 140  | weak  | weak | weak |
| 50   | weak  | weak | weak | b) 6 g Gelatine; 0.364 l Cream

|      | bloom |      |           |
| ---- | ----- | ---- | --------- |
| mesh | 180   | 220  | 260       |
| 140  | weak  | ok   | too rigid |
| 50   | weak  | ok   | too rigid | c) 12 g Gelatine; 0.358 l Cream

|      | bloom |      |      |
| ---- | ----- | ---- | ---- |
| mesh | 180   | 220  | 260  |
| 140  | All products are too weak because the dairy products could not be whisked smooth (too much gelatine) | | |
| 50   | | | |

Attention is drawn to test result 6 which shows results for 0.4 kg of the dairy product according to the invention, mixed with 0.4 l cream with a fat content of 36% fat. One essential property of a dairy product is the reversibility of the structure, that is, the ability of the dairy product to take up a homogenic structure at refrigerator temperatures (about 10° C.) even if the dairy product has been mixed with, for example, the same amount of cream and the structure of this mixture has been destroyed before at room temperature by the mixing process. Therefore, the superior reversibility of the structure characteristics of the dairy product containing 1.5% gelatine having a grain size of 50 mesh and a gel rigidity of 220 Bloom grams can be seen in the results.

Test Result 7

Ability to Absorb Oil

We started with 0.2 kg dairy product. Then 0.130 l sunflower-oil was stirred in continuously with the mixer "kitchen-aid" at level 4 a) 2.6 g Gelatine; 0.3672 l Cream

|      | bloom |      |      |
| ---- | ----- | ---- | ---- |
| mesh | 180   | 220  | 260  |
| 140  | separated after 5 min. | separated | partially separated |
| 50   | separated | separated | separated | b) 6 g Gelatine; 0.364 l Cream

|      | bloom |      |      |
| ---- | ----- | ---- | ---- |
| mesh | 180   | 220  | 260  |
| 140  | separated after 5 min. | partially separated | coagulated |
| 50   | separated after 4 hrs. | ok | coagulated. | c) 12 g Gelatine: 0.358 l Cream

|      | bloom |      |      |
| ---- | ----- | ---- | ---- |
| mesh | 180   | 220  | 260  |
| 140  | No oil can be absorbed, coagulation takes place | | |
| 50   | | | |

Referring finally to test result 7, a further parameter for a milk product of the type of the invention is studied. Said parameter is the ability of the product to absorb oil. This is, for example, important in the production of mayonnaise. In order to test the ability to absorb oil, we started with 0.2 kg dairy product Then 130 g sunflower-oil was stirred in continuously with the mixer "kitchen-aid" at level 4. It can be seen that only a dairy product containing 1.5% gelatine having a grain size of 50 mesh and a gel rigidity of 220 bloom g, is able to absorb 0.13 l sunflower-oil without effecting coagulation in any way.

Summarising the results of the foregoing tests, it has been found that the choice of the gelatine influences the stability and the life of the end product The dairy product according to the present invention wherein the proportion of gelatine is between 1% and 3%, preferably at about 1.5%, the gelatine a grain size of between 35 and 65 mesh, preferably 50 mesh, and having a gel rigidity of between 200 and 250 Bloom grams, preferably 220 Bloom grams, yields superior and unexpected beneficial properties in its field.

Although the present invention has been described in considerable detail, it will be appreciated that additional advantages and modifications will be readily apparent to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A dairy product of firm consistency having a homogeneous structure and comprising a plurality of adjacent cells, each cell having
   a core comprising a milk protein,
   an inner shell around the core, the inner shell comprising milk fat, and
   an outer shell around the inner shell, the outer shell comprising gelatin enriched with at least one component of a milk product.

2. The dairy product as set forth in claim 1, wherein said core further comprises milk ingredients other than protein and fat, wherein said milk ingredients includes at least one of milk sugar and minerals.

3. The dairy product as set forth in claim 1, wherein said inner shell comprises milk fat of milk cream.

4. The dairy product as set forth in claim 1, wherein said gelatin is enriched with at least one component of skim milk.

5. The dairy product as set forth in claim 1, wherein stabilization is accomplished by gelatin enriched with at least one component of milk.

6. The dairy product as set forth in claim 1, wherein gelatin enriched with skim milk serves as a stabilizer.

7. The dairy product as set forth in claim 1, wherein gelatin enriched with milk fat serves as the only stabilizer of the dairy product.

8. A dairy product as set forth in claim 1, wherein the dairy product contains at least 70% cream.

9. A dairy product as set forth in claim 1, wherein a proportion of gelatin is between 1% and 3%.

10. A dairy product as set forth in claim 1, wherein the dairy product has a fat content of about 15%.

11. A dairy product as set forth in claim 1 comprising cream and gelatin, wherein the gelatin used is produced from different kinds of medium- and/or high-bloom split cowhide.

12. A dairy product as set forth in claim 1 containing cream and gelatin enriched with milk product, wherein the homogeneous structure of the dairy product is reversible at refrigerator temperatures.

13. A dairy product as set forth in claim 12, wherein the dairy product assumes the firm and stiff consistency without decomposition when cooled after the consistency of the dairy product has been changed to almost a fluid consistency by a heating process or as a result of shear-forces.

14. The dairy product as set forth in claim 12, wherein the dairy product can be heated up over a temperature of about 40° C. and cooled down below a temperature of about 6° C. for several times without breaking down.

15. A dairy product as set forth in claim 12, wherein the homogeneous structure of the dairy product is reversible at 10° C.

16. A dairy product as set forth in claim 11, wherein the gelatin used is of a grain size of between 35 and 65 mesh and/or has a gel rigidity of between 200 and 250 Bloom-grams.

17. A dairy product as set forth in claim 11 comprising cream and gelatin, wherein the gelatin is of a viscosity of between 34 mb and 46 mb.

* * * * *